Figure 1:
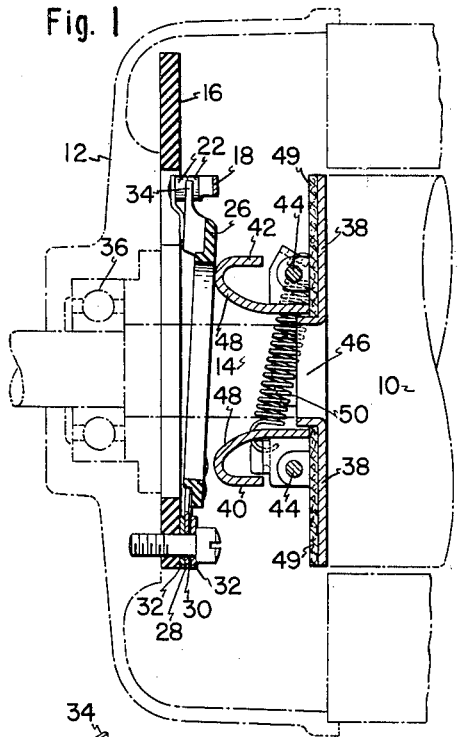

Aug. 15, 1950 M. KLEIMAN 2,519,140
CENTRIFUGAL CUTOUT SWITCH
Filed Sept. 6, 1946 2 Sheets-Sheet 1

INVENTOR.
MACKLEN KLEIMAN
BY *Jenney & Hildreth*
ATTORNEYS

Aug. 15, 1950  M. KLEIMAN  2,519,140
CENTRIFUGAL CUTOUT SWITCH
Filed Sept. 6, 1946  2 Sheets-Sheet 2

INVENTOR.
MACKLEN KLEIMAN
BY *Jenney & Hildreth*
ATTORNEYS

Patented Aug. 15, 1950

2,519,140

UNITED STATES PATENT OFFICE 2,519,140

CENTRIFUGAL CUTOUT SWITCH

Macklen Kleiman, Boston, Mass., assignor, by mesne assignments, to Holtzer-Cabot, Inc., Boston, Mass., a corporation of Delaware Application September 6, 1946, Serial No. 695,183

4 Claims. (Cl. 200—80)

The present invention relates to centrifugal switches or cut-outs, particularly adapted for control of the starting circuits of small single-phase alternating current motors.

Induction motors of the split phase type employ an auxiliary stator winding for starting purposes. This winding is energized during the starting period to provide a field displaced in time and space relative to the main winding to produce, in cooperation with the main winding, the rotating field required to start the motor. When the motor reaches a predetermined speed, the starting winding is cut out by a centrifugal switch and the motor thereafter runs as a straight induction motor.

There are a number of requirements that must be met if a cut-out is to give reliable service for long periods of time. For example, it is essential that the cut-out switch be so arranged that action once initiated proceeds to completion without fluttering of the contacts. A fluttering switch causes severe arcing at the contacts, resulting in rapid pitting and wear. With capacitor start motors, switch flutter may involve a substantial voltage overload on the condenser and possible damage thereto.

To minimize hunting between starting and running conditions in the case of motor overload, it is desirable to provide a substantial speed differential between the opening and the closing of the cut-out switch. By way of illustration, the switch may be arranged to cut out the starting circuit when the motor speed reaches approximately 75% of synchronous speed, while the closing speed may be of the order of 50% of synchronous speed.

Still another problem, more specific in nature, involves the proper action of the weights or other members which operate the switch by the action of centrifugal force. For correct balance, a symmetrical design is generally employed involving at least a pair of weights. These weights should operate simultaneously rather than independently if unbalance and erratic operation of the switch are to be avoided. Furthermore, the actuation of the switch should be relatively unaffected by initial conditions based on such factors as the opposing force of the switch elements and the amount of end play of the motor shaft.

In view of these considerations, the present invention has as an object the provision of a centrifugal cut-out having a wide speed differential, rapid-action opening and closing with the operation substantially unaffected by the switch pressure, and actuating weights so interconnected that substantially simultaneous action thereof is assured, so as to provide reliable operation of the switch over long periods of time.

One of the several features of the cut-out switch of the present invention involves the arrangement of weights and springs to insure that the outward movement of the weights, once initiated under the influence of centrifugal force, is continued to completion. More specifically, the centers of mass of the weights are so located and the relationship of the springs is such that the actuating torques due to centrifugal force increase during outward movement of the weights, while the restraining torques due to the springs decrease. Since the net torque acting to accelerate the weights in their outward movement is the difference between these torques, the weights "snap" to their outermost position, once action is initiated.

Another feature concerns the arrangement of centrifugal weights and switch actuator wherein the opposing force of the switch actuator is applied directly over the weight pivots, thus preventing the switch pressure from influencing the opening of the weights, a common cause of switch flutter.

As a further feature, simultaneous operation of the weights is insured by providing interconnecting means so arranged that initial opening movement of one weight reduces the restraining force on the other weight to insure the latter's opening along with the weight initiating the opening movement.

Another feature resides in the arrangement of the switching portion of the cut-out, wherein a resiliently mounted actuating member is provided intermediate the switching member and the centrifugal elements of the cut-out to make possible proper operation of the assembly with an appreciable range of tolerance in the axial relationship of the parts.

Figure 2:
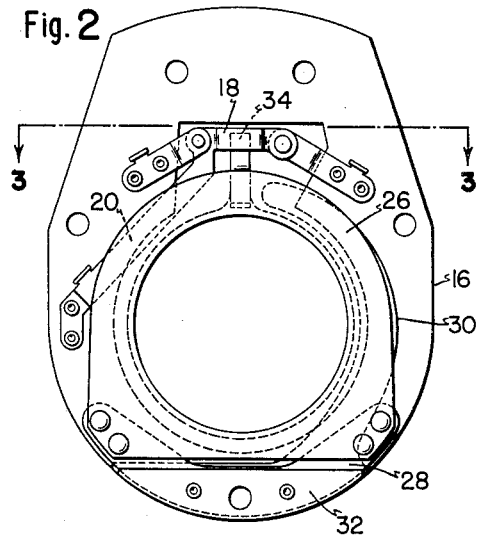
Figure 3:
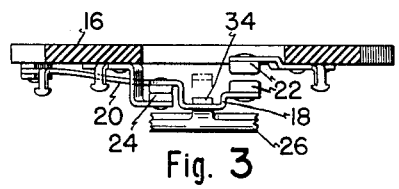
Figure 4:
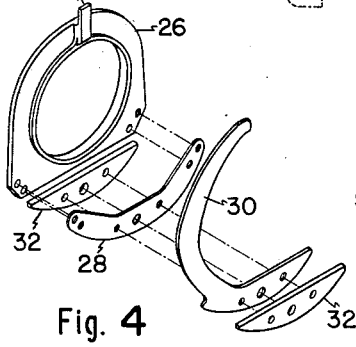
Figures 5, 6:
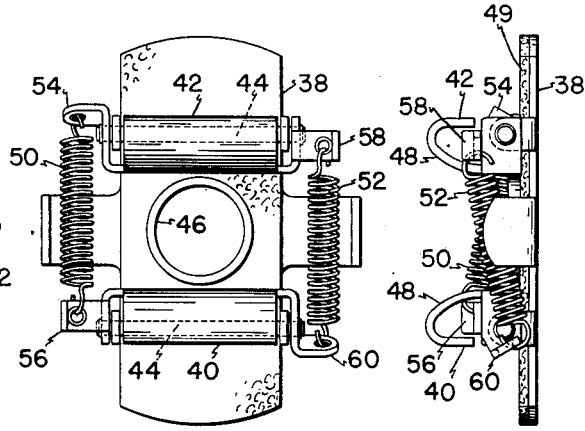
Figure 7:
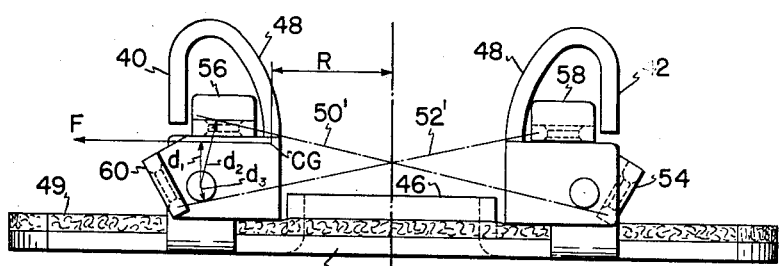
Figure 8:
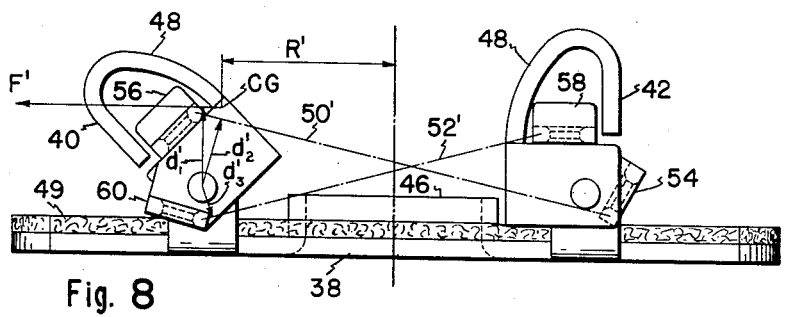

In the drawings illustrating the several features of the invention, Fig. 1 is a view in sectional elevation of the centrifugal cut-out switch installed in a typical motor, shown in outline, the parts being shown in at-rest position; Fig. 2 is a view in front elevation of the switching unit of the cut-out; Fig. 3 is a sectional plan view of the switching unit, taken along the line 3—3 of Fig. 2; Fig. 4 is an exploded view, taken obliquely, of portions of the switching assembly; Figs. 5 and 6 are views in front and side elevation, respectively, of the centrifugal unit of the cut-out, with the weights shown in closed position; and Figs. 7, 8 and 9 are enlarged diagrammatic views of the centrifugal unit showing the weights in closed, partly open, and fully open positions, respectively, the springs being omitted for clarity and their center lines being indicated by dot and dash lines.

The centrifugal cut-out switch is arranged for mounting in a motor between the armature 10 and the end frame 12. The cut-out comprises a switching unit secured to the end frame, and a centrifugal unit carried by and rotating with the motor shaft 14 to actuate the switch.

The switch unit or assembly shown in Figs. 1-4 comprises a fixed support 16 of insulating material, to which are secured one or more fixed contacts. A movable contact-carrying member 18 is mounted on a spring arm 20, the spring direction being such as to urge the contacts 22 of the starting circuit into engagement. Back contacts 24 may be provided for the control of a running circuit if desired, and additional contact pairs may be arranged, as circuit conditions may require.

Operation of the switching member 18 is effected by means of an actuator 26. This, like the support 16, may advantageously be of a laminated or impregnated insulating material having high mechanical strength. The actuator 26 is attached to the support 16 by means of a spring hinge strip 28 which permits swinging movement of the actuator toward and away from the support. A spring finger 30, likewise having its lower portion secured between clamping plates 32 at the lower edge of the support 16 (see Fig. 4), urges the actuator away from the support.

The actuator 26 is provided at its top with a tongue 34 which engages the rear of the movable switch element 18. The actuator spring 30 is arranged to be relatively stiffer than the spring arm 20 of the switch element, so that the actuator, when released by the centrifugal unit, overpowers the spring 20 and pulls the switch element outwardly to open the starting circuit contacts 22, as shown in Fig. 3. On the other hand, when the actuator is urged by the centrifugal unit toward the support 16, the tongue 34 moves to the approximate position shown in dotted outline in Fig. 3, thereby releasing the switch element 18 and causing the contacts 22 to close under the influence of spring arm 20.

It will be observed that both the switch support 16 and the actuator 26 are provided with large central openings, greater in diameter than the ball bearing assembly 36 of the motor. This permits removal of the motor end frame 12 and withdrawal of the bearing assembly through the switch unit without detaching the latter from the end frame.

The centrifugal or speed-responsive unit for actuating the switch comprises a supporting plate 38 and pivotally mounted weight elements 40 and 42 which are carried on pivot pins 44 transverse to the axis of the motor shaft 14. The plate 38 is adapted to be mounted on and to rotate with the motor shaft through the provision of a press fit between the motor shaft and the sleeve portion 46 of the plate, or by other suitable connection. The weights 42 are formed with curved cam-like surfaces 48 for engagement with and operation of the switch actuator 26. A layer of felt 49 or other soft material is carried by the plate 38 to minimize the impact of the weights on reaching open position. Tension springs 50 and 52 restrain outward swinging movement of the weights until the motor speed rises to the desired value for operation of the cut-out switch.

In the at-rest position, or at motor speeds below that at which the cut-out becomes operative to disconnect the starting circuit, the weights are in the closed position shown in Fig. 1. In this position the cam surfaces 48 engage and maintain the switch actuator 26 in retracted position to allow the switch-member 18 to close the starting circuit contacts 22. Since the starting circuit is closed by disengaging the actuator from the switch-member, the axial spacing of the centrifugal unit relative to the switch unit is not critical, as there is considerable leeway possible in the disengaged position of the actuator 26 under the influence of the centrifugal unit without affecting the switching member 18.

The tension springs 50 and 52 interconnect the weights in a crossed relation that in large part is responsible for the improved operating characteristics of the cut-out. To connect the springs in this special crossed relation, the weights are provided with lugs or arms extending outwardly beyond the ends of the pivot pins to receive the looped ends of the springs. Spring 50 is connected to weight arms 54 and 56, while spring 52 extends between arms 58 and 60. The geometry of the arrangement is best illustrated in the partly diagrammatic views, Figs. 7, 8 and 9, wherein the springs are represented by dot and dash lines 50' and 52' corresponding to the spring center lines and drawn to the respective spring fulcrum points on the weight arms.

In the closed position of the weights shown in Fig. 7, the arms 54 and 60 provide fulcrum points for the respective spring ends close to the pivotal axes of the weights, with the spring centerlines passing slightly to the rear of said axes. At their other ends, however, the springs connect to the arms 56 and 58 at points that provide an appreciable moment arm to resist outward swinging movement of the weights. Thus the weight 40 is restrained solely by spring 50, and the weight 42 solely by spring 52.

As a result of this spring arrangement, the two weights are caused to operate as a unit, both for opening and closing movements. The diagrammatic view, Fig. 8, shows the effect of the crossed relationship in attaining coordinated operation. In this view it is assumed, for purposes of illustration, that the weight 40 has initially opened to the position shown before the weight 42 has even started to swing out. A twofold effect on the spring system is apparent as a result of the rotation of weight 40; the tension in spring 50 has increased, and that of spring 52 has decreased. This substantially reduces the net restraining torque on the weight 42 and thus insures its prompt opening, in effect simultaneously with the completion of opening by weight 40. Since the center of gravity CG of each weight may be so located that a substantial increase in its effective radius of rotation about the axis of the motor shaft takes place, as well as an increase in its effective moment arm, as the weights move from closed to open position, there is a rapid increase in the torque acting to swing the weights about their pivots to open position, once opening movement is initiated. As a result, any opening movement of one of the weights proceeds rapidly to completion, without requiring a continuing increase in motor speed, and the immediate reduction in restraint on the lagging weight causes that likewise to snap to full-open position.

The effect of the spring arrangement on the operating characteristics (i. e., snap action and speed differential) of the cut-out is revealed by an analysis of the torques acting on the centrifugal weight elements.

The torque $T_1$ tending as a result of centrifugal force to rotate weight 40 outwardly is given by $$T_1 = F_1 d_1 \qquad (1)$$

where $F_1$ is the force due to centrifugal action, and $d_1$ is the moment arm of $F_1$ (perpendicular distance from weight pivot to line of action of force $F_1$ through center of gravity CG).

The torque opposing the outward rotation of weight 40 is $$T_2 - T_3 = F_2 d_2 - F_3 d_3 \qquad (2)$$

where $F_2$ is the force exerted by spring 50,
$d_2$ is the moment arm of $F_2$,
$F_3$ is the force exerted by spring 52, and
$d_3$ is the moment arm of $F_3$ Then $T_0$, the net torque, is given by $$T_0 = T_1 - (T_2 - T_3) \qquad (3)$$

Assuming equal springs $(F_2 = F_3)$, $$T_0 = F_1 d_1 - F_2 (d_2 - d_3) \qquad (4)$$

Since the angular acceleration of the weight elements on swinging outwardly is a function of $T_0$, for rapid opening $T_0$ should increase rapidly as the weights open. This increase in $T_0$ can be attained by causing $T_1$ to increase, by causing $T_2 - T_3$ to decrease, or by a combination of the two.

Figure 9:
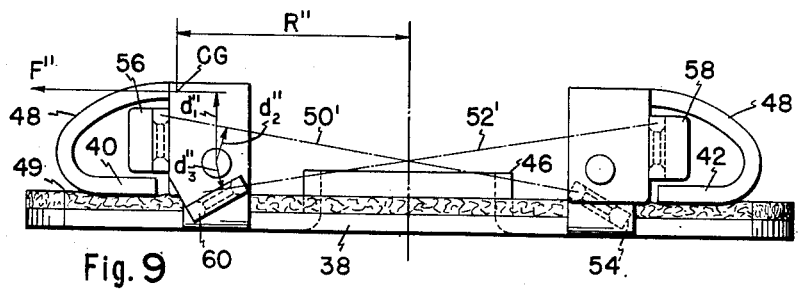

A substantial increase in $T_1$, the torque due to centrifugal force, as the weights move outwardly is brought about by arranging the weights so that not only is there a considerable increase in the effective radius of rotation of the center of gravity CG about the motor shaft, but also a marked increase in the moment arm $d$, as the weights swing outwardly. Compare, for purposes of illustration, the radius R representing closed position (Fig. 7) with radius R'', the open position (Fig. 9); also compare the closed moment arm $d$, with the partly open moment $d_1'$ (Fig. 8), and fully open moment arm $d_1''$ (Fig. 9).

To provide, in addition to snap action, an appreciable differential between the motor speed for cut-out opening and the speed for cut-out closing, it is necessary that the design be such that $T_2 - T_3$, the torque due to the restraining springs, decrease from its initial to its final value as the weight elements swing from their inner to their outer positions. Such decrease in $T_2 - T_3$ is likewise beneficial, as has already been pointed out, in attaining rapid snap action, since $T_0$ increases upon a decrease in $T_2 - T_3$.

To achieve this reduction in net torque due to the springs as the weights swing from closed to open position, the moment arm $d_2$ should decrease from a maximum value, while the moment arm $d_3$ increases from a minimum value. The spring pivot locations may be thus selected, subject to the limitations that the minimum values of $d_2$ and $d_3$ must be greater than zero, and likewise that the value of $d_2 - d_3$ must also be greater than zero. Locations of the spring points approximating those of the illustrative embodiment comply with these requirements. In the three figures, Figs. 7, 8 and 9, $d_2 > d_3, d_2' > d_3'$ and $d_2'' > d_3''$, respectively.

Before the weights begin to swing outwardly from closed position it will be observed that the torques acting on the weight elements are only those due to centrifugal force and to the tension springs, that is, torques determined by the characteristics of the centrifugal unit itself. The switch pressure, since it is exerted directly over the pivot pins for the weights when the latter are in closed position (see particularly Fig. 1), has no tendency to induce opening of the weights. As a consequence, the speed of the motor at which the cut-out opens is dependent solely on the action of centrifugal unit, unaffected by the opposing force of the switch.

To summarize my invention, a centrifugal cut-out has been provided that is characterized by interconnected weights so arranged that a rapid or snap action operation is assured, together with substantially simultaneous operation of the separate weight elements. In particular, the crossed relationship of the restraining springs permits an increasing unbalanced torque as the weights swing out, and likewise enables a substantial speed differential between opening and closing speeds readily to be obtained.

Furthermore, the relationship of weight and switch elements is such that opening conditions are independent of switch pressure, thereby eliminating any tendency to switch flutter as a result of interaction between the switch and the centrifugal unit.

I claim:

1. In a centrifugal cut-out switch having a rotatable member, weight elements pivotally mounted thereon on axes transverse to the axis of rotation of the rotatable member for outward swinging movement under the influence of centrifugal force, said weights having a range of swinging movement of approximately ninety degrees, and tension springs interconnecting the said weight elements and opposing outward swinging movement thereof, said springs being arranged in crossed relation relative to the pivotal axes of the weight elements, the points of connection of the springs to the weight elements being disposed to provide for each weight element a moment arm tending to restrain opening of the weight element and a moment arm tending to open said weight element, the center of gravity of each weight being disposed to provide an increase in the effective moment arm thereof as the weight swings from closed to open position.

2. In a centrifugal cut-out switch having a rotatable member, weight elements pivotally mounted thereon for outward swinging movement under the influence of centrifugal force, the axes of said pivots being transverse to the axis of rotation of the rotatable member, resilient means opposing outward movement of the weight elements, and a switch actuator having resilient means urging the actuator toward the weight elements, said weights directly engaging the actuator when the weights are in closed position, with the points of contact between actuator and weights disposed directly over the weight pivots when the weights are in closed position to prevent developing a torque tending to swing the weights from closed position.

3. In a centrifugal cut-out switch having a rotatable member, weight elements pivotally mounted thereon for outward swinging movement under the influence of centrifugal force, the axes of said pivots being transverse to the axis of rotation of the rotatable member, resilient means opposing outward movement of the weight elements, switching means actuated by the weight elements, said switching means comprising a switch element and an actuator, the switch element having a spring tending to close the switch, resilient means associated with the actuator for causing the actuator, when released by the weights, to overpower the switch spring and open the switch, the actuator being mounted to be out of engagement with the weights when the weights are in open position and to be disengaged from the switch element when the weights are in closed position.

4. In a centrifugal cut-out switch having a rotatable member, weight elements pivotally mounted thereon for outward swinging movement under the influence of centrifugal force, the axes of said weight pivots being transverse to the axis of rotation of the rotatable member, resilient means interconnecting the weight elements in crossed relation relative to the weight axes to induce substantially simultaneous swinging movement of the weights under the influence of centrifugal force, said weight elements having cam surfaces, a switch actuator engaged by the cam surfaces of the weights when the latter are in closed position, said actuator being movable axially of the direction of rotation of the rotatable member, and resilient means urging the actuator toward the weight elements, the points of contact between the actuator and the cam surfaces of the weight elements lying directly over the weight pivots when the weights are in closed position and being displaced outwardly when the weights have moved from closed position.

MACKLEN KLEIMAN.

REFERENCES CITED

The following references are of record in the file of this patent:

UNITED STATES PATENTS

| Number | Name | Date |
|---|---|---|
| 934,920 | Kennedy | Sept. 21, 1909 |
| 1,722,117 | Suter | July 23, 1929 |
| 2,066,989 | Leland | Jan. 5, 1937 |
| 2,210,687 | Schaelchlin et al. | Aug. 6, 1940 |
| 2,372,064 | Esarey | Mar. 20, 1945 |
| 2,293,996 | Naul | Aug. 25, 1942 |